United States Patent
Kawakami

(10) Patent No.: US 11,351,704 B2
(45) Date of Patent: Jun. 7, 2022

(54) RESIN INJECTION MOLDING METHOD

(71) Applicant: SUBARU CORPORATION, Tokyo (JP)

(72) Inventor: Munehito Kawakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 193 days.

(21) Appl. No.: 16/774,129

(22) Filed: Jan. 28, 2020

(65) Prior Publication Data

US 2020/0307043 A1 Oct. 1, 2020

(30) Foreign Application Priority Data

Mar. 28, 2019 (JP) .............................. JP2019-063052

(51) Int. Cl.
*B29C 45/00* (2006.01)
*B29C 45/26* (2006.01)

(52) U.S. Cl.
CPC ...... *B29C 45/0001* (2013.01); *B29C 45/0005* (2013.01); *B29C 45/2608* (2013.01)

(58) Field of Classification Search
CPC ............ B29C 45/0005; B29C 45/0001; B29C 45/26908; B29C 45/0046; B29C 45/5675; B29C 45/572

See application file for complete search history.

(56) References Cited

U.S. PATENT DOCUMENTS

| | | | | | |
|---|---|---|---|---|---|
| 5,484,563 | A | * | 1/1996 | Miyazaki | ............ B29C 45/0025 264/328.12 |
| 6,027,328 | A | * | 2/2000 | Herbst | ................ B29C 45/2803 264/161 |
| 2006/0237874 | A1 | * | 10/2006 | Kurihara | ............. B29C 45/0025 264/328.1 |
| 2018/0264699 | A1 | * | 9/2018 | Clarke | .................. B29C 45/561 |
| 2021/0170654 | A1 | * | 6/2021 | Ikeda | ...................... B29C 45/36 |

FOREIGN PATENT DOCUMENTS

| | | | | | |
|---|---|---|---|---|---|
| JP | 07214601 | A | * | 8/1995 | ......... B29C 45/2628 |
| JP | H9-248829 | | | 9/1997 | |

* cited by examiner

*Primary Examiner* — Kelly M Gambetta
*Assistant Examiner* — Virak Nguon
(74) *Attorney, Agent, or Firm* — Smith, Gambrell & Russell, LLP

(57) ABSTRACT

A resin injection molding method uses a mold having a cavity and a hole-forming columnar body. The hole-forming columnar body is movable in an axial direction while extending through the cavity, and includes a first diameter portion having a first diameter, a second diameter portion having a diameter greater than the first diameter, and a tapered portion having a diameter gradually increasing from the first diameter portion toward the second diameter portion. The method includes moving the hole-forming columnar body in the axial direction such that at least one of the first diameter portion or the tapered portion is positioned in the cavity, injecting the molten resin to fill the cavity, maintaining an inside of the cavity under pressure, moving the hole-forming columnar body in the axial direction such that the second diameter portion is positioned in the cavity, and solidifying the injected filling molten resin.

4 Claims, 1 Drawing Sheet

RESIN INJECTION MOLDING METHOD

CROSS-REFERENCE TO RELATED APPLICATIONS

The present application claims priority from Japanese Patent Application No. 2019-063052 filed on Mar. 28, 2019, the entire contents of which are hereby incorporated by reference.

BACKGROUND

The disclosure relates to a resin injection molding method, and particularly relates to a resin injection molding method using a mold in which a hole-forming columnar body for forming a hole in an injection-molded article is disposed in a cavity that is filled with injected molten resin.

When injection molding resin, a weld is likely to be formed at the point where flows of resin meet in the cavity. The term "weld" usually means a "joint", but here means a "fragile portion" formed at the point where flows of resin meet. In particular, at a weld formed as the point where flows of resin with reinforcement fibers mixed and kneaded therein meet, the orientation of the reinforcement fibers is different from that in the other area, so that a reduction in mechanical properties similar to that caused by anisotropy occurs, and stress concentration is also likely to occur. Moreover, when flows of molten resin injected into the cavity go around the outer periphery of the hole-forming columnar body and meet, the resin flow stagnates at the weld. As a result, a notch-shaped recess similar to a nest may be formed in the surface of the hole of the injection-molded article. This notch-shaped recess not only impairs the appearance, but also becomes a source that generates a crack due to stress concentration.

For example, Japanese Unexamined Patent Application Publication (JP-A) No. 9-248829 discloses a mold assembly for injection molding that prevents generation of such a weld. This mold assembly for injection molding has a mold surface and a hole-forming columnar body that are made of a low heat conduction material so as to delay curing of resin, thereby preventing generation of a weld. The notch-shaped recess in the hole surface is assumed to be generated due to local solidification of resin and variations in the molten state, which are the cause of the weld. Accordingly, generation of the notch-shaped recess may be prevented by preventing generation of the weld.

SUMMARY

An aspect of the disclosure provides a resin injection molding method. The resin injection molding method uses a mold having a cavity and a hole-forming columnar body. The cavity is configured to be filled with injected molten resin. Flows of the injected molten resin meet on an outer periphery of the hole-forming columnar body. The hole-forming columnar body is disposed in the cavity to form a hole in an injection-molded article. The hole-forming columnar body is movable in an axial direction while extending through the cavity. The hole-forming columnar body includes a first diameter portion having a first diameter, a second diameter portion having a diameter greater than the first diameter, and a tapered portion having a diameter gradually increasing from the first diameter portion toward the second diameter portion. The mold includes, at a cavity-side edge of a through portion for the hole-forming columnar body, a seal member that has elasticity to follow changes in outside diameter caused by an axial movement of the hole-forming columnar body and that seals the cavity. The resin injection molding method includes: moving the hole-forming columnar body in the axial direction such that at least one of the first diameter portion or the tapered portion is positioned in the cavity; injecting the molten resin to fill the cavity in which the hole-forming columnar body is positioned in the moving the hole-forming columnar body in the axial direction such that at least one of the first diameter portion or the tapered portion is positioned in the cavity; maintaining a pressure of an inside of the cavity, after the molten resin is injected to fill the cavity; moving the hole-forming columnar body in the axial direction such that the second diameter portion is positioned in the cavity, after the pressure of the inside of the cavity is maintained; and cooling the injected filling molten resin to solidify the injected filling molten resin after the moving the hole-forming columnar body in the axial direction such that the second diameter portion is positioned in the cavity, after the pressure of the inside of the cavity is maintained.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Hereinafter, a resin injection molding method according to an embodiment of the disclosure will be described in detail with reference to the drawings.

According to the mold assembly for injection molding disclosed in JP-A 9-248829, the cooling efficiency after injection of resin is reduced. Therefore, the cooling time, that is, the solidification time of resin is increased, so that the cycle time is increased.

It is desirable to provide a resin injection molding method capable of eliminating a notch-shaped recess in the hole surface of an injection-molded article where flows of resin meet, without increasing the cycle time.

Figure 1A:
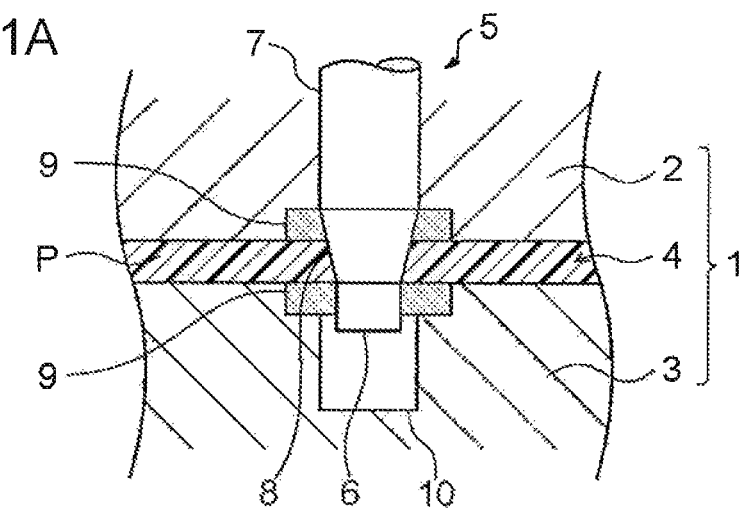
FIGS. 1A, 1B, and 1C are explanatory views each illustrating a state of an injection-molded article being manufactured using a mold to which a resin injection molding method according to an embodiment of the disclosure is applied.
Figure 1B:
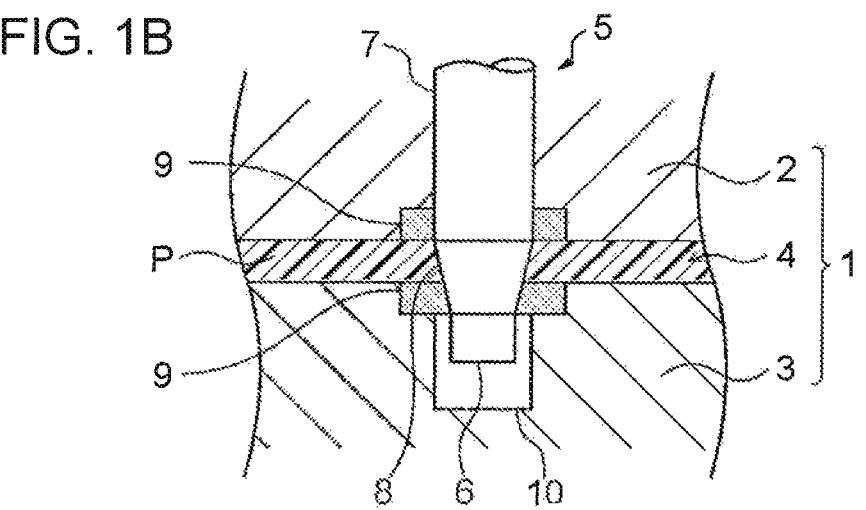
Figure 1C:
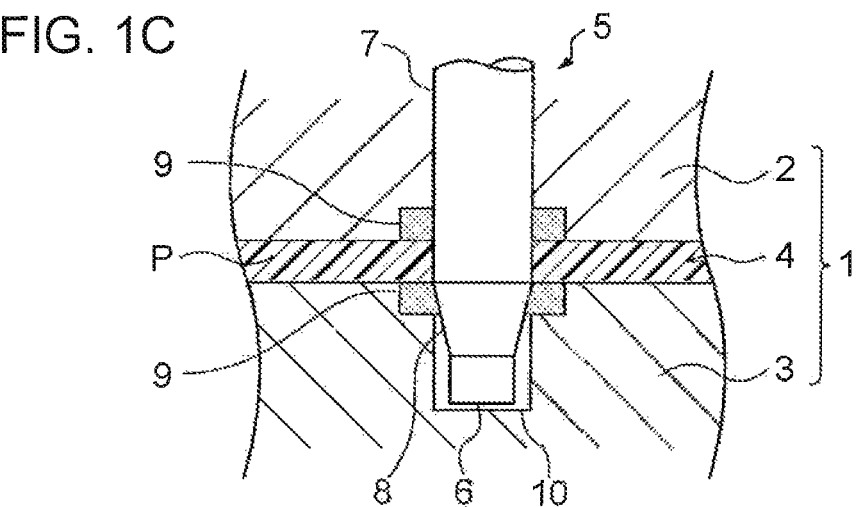

FIGS. 1B, and 1C are schematic explanatory views each illustrating a state of an injection-molded article being manufactured according to this embodiment. FIGS. 1A, 1B, and 1C illustrate a region near a hole of an injection-molded article that is manufactured in a mold 1. According to this embodiment, the mold 1 includes an upper mold 2 and a lower mold 3, and a cavity 4 is formed therebetween. Molten resin P is injected to fill the cavity 4. The molten resin P has reinforcement fibers mixed and kneaded therein. The reinforcement fibers that are mixed and kneaded may be fibers of any length such as short fibers, long fibers, and continuous fibers. The material of the fibers may be carbon fibers, glass fibers, or the like. It should be noted that the molten resin P does not need to contain reinforcement fiber as will be described below.

A hole-forming columnar body 5 extending in the vertical direction in the drawings is disposed so as to extend through the cavity 4 at a part where a hole is to be formed in the injection-molded article. The hole-forming columnar body 5 includes a first diameter portion 6 having a small diameter at the lower end in the drawings, a second diameter portion 7 formed on the upper side of the first diameter portion 6 and having a greater diameter than the first diameter portion 6, and a tapered portion 8 formed therebetween and having a diameter that gradually increases from the first diameter portion 6 toward the second diameter portion 7. In one embodiment, the small diameter may serve as a "first diameter" and the greater diameter may serve as a "second diameter". The outside diameter of the second diameter portion 7 is equal to the inside diameter of the hole to be formed in the injection-molded article. The outside diameter of the first diameter portion 6 is set, for example, within the range in which a seal member 9 (described below) can follow the changes in the outside diameter that occur when the hole-forming columnar body 5 moves in the axial direction as will be described below.

The seal member 9 that adheres to the outer peripheral surface of the hole-forming columnar body 5 to seal the cavity 4 is disposed at the cavity-4-side edge of a through portion for the hole-forming columnar body 5 in the upper mold 2 and the lower mold 3. The seal member 9 is made of hard rubber having elasticity to follow the changes in outside diameter caused by an axial movement of the hole-forming columnar body 5 to adhere to its outer peripheral surface, for example. As will be described below, in this embodiment, for example, when the hole-forming columnar body 5 is lowered, a change is made from a state in which at least one of the first diameter portion 6 or the tapered portion 8 is positioned in the cavity 4 to a state in which the second diameter portion 7 is positioned in the cavity 4. In this process, the seal member 9 follows the changes in the outside diameter of the hole-forming columnar body 5 to adhere to its outer peripheral surface. The lower mold 3 has an accommodation recess 10 that accommodates the lowered hole-forming columnar body 5, under the seal member 9 for the lower mold 3.

According to the resin injection molding method of this embodiment, a preliminary movement step of the hole-forming columnar body 5 is first performed. In this step, as illustrated in FIG. 1A, the hole-forming columnar body 5 is moved in the axial direction by a driving source (not illustrated) such that at least one of the first diameter portion 6 or the tapered portion 8 (the tapered portion 8 in the drawing) is positioned in the cavity 4 formed by joining the upper mold 2 and the lower mold 3. Then, in an injection-filling step, the molten resin P is injected from the left in the drawing to fill the cavity 4. The flow of the molten resin P splits at the upstream of the hole-forming columnar body 5, that is, on the left in the drawing, to go around the outer periphery of the hole-forming columnar body 5, and the split flows meet at the downstream, that is, on the right in the drawing. A weld is generated at the point where the flows of the molten resin P meet. The weld is, for example, a mechanically fragile portion generated due to local solidification in the molten resin P and variations in the molten state when the molten resin P flows around the outer periphery of the hole-forming columnar body 5. When the weld is generated, the flow of the molten resin P stagnates, which may result in a notch-shaped recess in the molten resin P on the outer periphery of the hole-forming columnar body 5. As described above, this notch-shaped recess is similar to a nest. The notch-shaped recess not only impairs the appearance of the product, but also becomes a source that generates a crack due to stress concentration.

Further, as is well known, at the weld where two flows of the molten resin P going around the outer periphery of the hole-forming columnar body 5 meet each other, the extending direction of the reinforcement fibers mixed and kneaded in the molten resin P faces the merging direction of the two flows. Meanwhile, in the area other than the weld, the extending direction of the reinforcement fibers is aligned with the flowing direction of the molten resin P. Accordingly, in FIG. 1A, for example, the reinforcement fibers downstream in the flowing direction of the molten resin P extend in the lateral direction in the drawing, but the reinforcement fibers at the weld immediately downstream of the hole-forming columnar body 5 extend in the direction orthogonal to the paper surface. That is, the extending direction of the reinforcement fibers at the weld is different from that in the other area. This also contributes to the mechanical fragility of the weld.

After the injection-filling step of the molten resin P, a so-called dwelling step is performed to maintain a pressure inside the cavity 4 constant. After dwelling in the cavity 4, as illustrated in FIG. 1B, a diameter-increasing movement step of the hole-forming columnar body 5 is performed. In this step, the hole-forming columnar body 5 is lowered, that is, moved axially downward such that the second diameter portion 7 is eventually positioned in the cavity 4 as illustrated in FIG. 1C. As described above, since the outside diameter of the second diameter portion 7 is set to be equal to the specified inside diameter of the hole, the inside diameter of the hole becomes equal to the specified inside diameter in this step. Further, the molten resin P on the outer periphery of the hole-forming columnar body 5 is compressed in accordance with the increase in the diameter of the hole-forming columnar body 5. Therefore, even if a notch-shaped recess is formed in the molten resin P on the outer periphery of the hole-forming columnar body 5, the notch-shaped recess is eliminated as the molten resin P is compressed. As a result, generation of a notch-shaped recess in the hole surface is prevented. Furthermore, since the molten resin P maintained under pressure is compressed, a compression stress is applied to the surface of the hole, and remains in the product. This residual compression stress reinforces the surface of the hole of the injection-molded article.

The hole-forming columnar body 5 may be rotated about its axis simultaneously with the diameter-increasing movement step or after the diameter-increasing movement step of the hole-forming columnar body 5. As the hole-forming columnar body 5 is rotated, the molten resin P is rotated together due to the frictional resistance and adherence between the hole-forming columnar body 5 and the molten resin P. This changes the orientation of the reinforcement fibers in the molten resin P on the outer periphery of the hole-forming columnar body 5. For example, the reinforcement fibers are oriented in the circumferential direction of the hole-forming columnar body 5. The rotational direction of the hole-forming columnar body 5 is not limited to one direction, and may be a combination of the clockwise direction and the counterclockwise direction. Further, such rotation may be repeated. This allows to control the orientation of the reinforcement fibers on the outer periphery of the hole-forming columnar body 5, that is, on the surface of the hole of the injection-molded article, which usually makes it possible to improve the strength. Meanwhile, the molten resin P around the hole is stirred, so that local solidification or variations in molten state, which are the cause of the weld, are averaged out. This reduces stagnation of the flow of the molten resin P, and hence reduces generation of a notch-shaped recess itself.

After the diameter-increasing movement step of the hole-forming columnar body 5, a cooling step for solidifying the molten resin P is performed. After completion of solidification of the molten resin P in the cavity 4 in the cooling step, the mold 1 is taken off to remove the injection-molded article.

As described above, according to this embodiment, the hole-forming columnar body 5 is first moved in the axial direction such that at least one of the first diameter portion 6 or the tapered portion 8 is positioned in the cavity 4. Then, after injecting the molten resin P to fill the cavity 4, the inside of the cavity 4 is maintained under pressure. Then, the hole-forming columnar body 5 is moved in the axial direction such that the second diameter portion 7 is positioned in the cavity. 4. Then, the injected filling molten resin P is solidified. According to this resin injection molding method, the hole-forming columnar body 5 is moved in the axial direction after dwelling in the cavity 4 and before cooling, and then its outer diameter is increased from that of the first diameter portion 6 or the tapered portion 8 to that of the second diameter portion 7. In accordance with the increase in diameter, the molten resin P filled on the outer periphery of the hole-forming columnar body 5 is compressed. Accordingly, even if a notch-shaped recess is formed in the molten resin P on the outer periphery of the hole-forming columnar body 5, the notch-shaped recess is eliminated as the diameter of the hole-forming columnar body 5 increases. As a result, generation of a notch-shaped recess in the hole surface of the injection-molded article is prevented.

In the above process, since the hole-forming columnar body 5 is simply moved in the axial direction, the cycle time taken for injection molding including solidification of the molten resin P is not increased. Also, in this step, while the hole-forming columnar body 5 is moved in the axial direction, the reaction force from the compressed molten resin P is applied in the radial direction of the hole-forming columnar body 5. Accordingly, the hole-forming columnar body 5 is moved in the axial direction without a large driving force. Furthermore, since the molten resin P on the outer periphery of the hole-forming columnar body 5 is compressed after dwelling, residual compression stress is applied to the hole surface of the injection-molded article, thereby improving the strength.

Further, before the cooling step, and simultaneously with or after the diameter-increasing movement of the hole-forming columnar body 5, the hole-forming columnar body 5 is rotated about its axis. Then, the molten resin P is moved with rotation of the hole-forming columnar body 5 about its axis, due to the frictional resistance and adherence between the outer peripheral surface of the hole-forming columnar body 5 and the molten resin P in contact therewith. Therefore, the molten resin P is stirred, so that local solidification or variations in molten state, which are the cause of the weld, are averaged out. This reduces stagnation of the flow of the molten resin P, and hence reduces generation of a notch-shaped recess itself. This also allows to control the orientation of the reinforcement fibers mixed and kneaded in the molten resin P, which makes it possible to further improve the strength.

Although the resin injection molding method according to the embodiment has been described above, the disclosure is not limited to the above embodiment, and various changes may be made within the scope of the disclosure. For example, in the above embodiment, the shape of the cavity 4 in the mold 1, that is, the shape of the injection-molded article is a flat plate. However, the shape of the injection-molded article in which a hole is formed may be any shape.

Further, in the above embodiment, the seal member 9 that adheres to the outer peripheral surface of the hole-forming columnar body 5 to seal the cavity 4 is made of hard rubber. However, as described above, the seal member 9 may be made of any material that can follow the changes in outside diameter caused by an axial movement of the hole-forming columnar body 5.

Furthermore, in the above embodiment, the method of injection molding using resin obtained by mixing and kneading reinforcement fibers in molten resin. However, the resin injection molding method according to the disclosure is also applicable to a case in which resin with no reinforcement fibers mixed and kneaded therein are used.

As described above, according to the example of the disclosure, since a notch-shaped recess formed in molten resin on the outer periphery of the hole-forming columnar body can be eliminated, no notch-shaped recess remains in the hole surface of the injection-molded article. Moreover, the hole surface can be reinforced by residual compression stress. Accordingly, it is possible to improve not only the appearance but also the strength of the injection-molded article.

The invention claimed is:

1. A resin injection molding method using a mold having a cavity and a hole-forming columnar body,
   the cavity being configured to be filled with injected molten resin, flows of the injected molten resin meeting on an outer periphery of the hole-forming columnar body,
   the hole-forming columnar body being disposed in the cavity to form a hole in an injection-molded article, being movable in an axial direction while extending through the cavity, and comprising a first diameter portion having a first diameter, a second diameter portion having a diameter greater than the first diameter, and a tapered portion having a diameter gradually increasing from the first diameter portion toward the second diameter portion,
   the mold including, at a cavity-side edge of a through portion for the hole-forming columnar body, a seal member that has elasticity to follow changes in outside diameter caused by an axial movement of the hole-forming columnar body and that seals the cavity,
   the resin injection molding method comprising:
   moving the hole-forming columnar body in the axial direction such that at least one of the first diameter portion or the tapered portion is positioned in the cavity;
   injecting the molten resin to fill the cavity in which the hole-forming columnar body is positioned in the moving the hole-forming columnar body in the axial direction such that at least one of the first diameter portion or the tapered portion is positioned in the cavity;
   maintaining a pressure of an inside of the cavity, after the molten resin is injected to fill the cavity;
   moving the hole-forming columnar body in the axial direction such that the second diameter portion is positioned in the cavity, after the pressure of the inside of the cavity is maintained; and
   cooling the injected filling molten resin to solidify the injected filling molten resin after the moving the hole-forming columnar body in the axial direction such that the second diameter portion is positioned in the cavity, after the pressure of the inside of the cavity is maintained.

2. The resin injection molding method according to claim 1, wherein the hole-forming columnar body is rotated about an axis thereof, before the cooling the injected filling molten resin to solidify the injected filling molten resin, and simultaneously with or after the moving the hole-forming columnar body in the axial direction such that the second diameter portion is positioned in the cavity, after the pressure of the inside of the cavity is maintained.

3. The resin injection molding method according to claim 2, wherein reinforcement fibers are mixed and kneaded in the molten resin.

4. The resin injection molding method according to claim 1, wherein reinforcement fibers are mixed and kneaded in the molten resin.

* * * * *